(12) United States Patent
Yamashita

(10) Patent No.: US 12,163,571 B2
(45) Date of Patent: Dec. 10, 2024

(54) DAMPING FORCE ADJUSTABLE SHOCK ABSORBER

(71) Applicant: Hitachi Astemo, Ltd., Hitachinaka (JP)

(72) Inventor: Mikio Yamashita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 452 days.

(21) Appl. No.: 17/441,893

(22) PCT Filed: Feb. 12, 2020

(86) PCT No.: PCT/JP2020/005267
§ 371 (c)(1),
(2) Date: Sep. 22, 2021

(87) PCT Pub. No.: WO2020/195264
PCT Pub. Date: Oct. 1, 2020

(65) Prior Publication Data
US 2022/0018417 A1  Jan. 20, 2022

(30) Foreign Application Priority Data
Mar. 26, 2019  (JP) ................... 2019-058729

(51) Int. Cl.
*F16F 9/34* (2006.01)
*F16F 9/18* (2006.01)
(Continued)

(52) U.S. Cl.
CPC .............. *F16F 9/504* (2013.01); *F16F 9/185* (2013.01); *F16F 9/34* (2013.01); *B60G 13/08* (2013.01);
(Continued)

(58) Field of Classification Search
CPC .... B60G 13/08; B60G 17/08; B60G 2202/24; B60G 2204/62; B60G 2206/41;
(Continued)

(56) References Cited

U.S. PATENT DOCUMENTS 4,723,640 A * 2/1988 Beck ..................... F16F 9/46
188/266.8
5,168,965 A * 12/1992 Huang ................... F16F 9/46
188/379
(Continued)

FOREIGN PATENT DOCUMENTS

JP  2012-206685  10/2012
KR  10-2005-0104250  11/2005
(Continued)

OTHER PUBLICATIONS

Office Action issued Jan. 27, 2023 in corresponding Korean Patent Application No. 10-2021-7030289, with Machine translation.
(Continued)

*Primary Examiner* — Nicholas J Lane
(74) *Attorney, Agent, or Firm* — Wenderoth, Lind & Ponack, L.L.P.

(57) ABSTRACT

A damping force adjustable shock absorber includes a flow path (an oil passage of a piston) in which a flow of hydraulic fluid is generated due to a movement of a piston rod, and a damping force adjustment valve provided in the flow path and configured to be subjected to an adjustment of an opening/closing operation by a solenoid. A frequency adaptive mechanism is provided in the flow path in series with the damping force adjustment valve. The frequency adaptive mechanism is configured to reduce a damping force for a high-frequency vibration. The frequency adaptive mechanism includes a second valve mechanism (a compression-side damping force generation valve and an extension-side damping force generation valve) configured to apply a
(Continued)

resistance force to a flow of the hydraulic fluid from an upstream-side chamber (an upper-portion chamber or a lower-portion chamber) to a downstream-side chamber (the lower-portion chamber or the upper-portion chamber).

6 Claims, 8 Drawing Sheets

(51) Int. Cl.
*F16F 9/504* (2006.01)
*B60G 13/08* (2006.01)
*B60G 17/08* (2006.01)

(52) U.S. Cl.
CPC .......... *B60G 17/08* (2013.01); *B60G 2202/24* (2013.01); *B60G 2204/62* (2013.01); *B60G 2206/41* (2013.01); *B60G 2500/104* (2013.01); *B60G 2500/11* (2013.01); *B60G 2600/182* (2013.01); *B60G 2600/21* (2013.01); *B60G 2800/162* (2013.01); *B60G 2800/916* (2013.01); *F16F 2222/12* (2013.01); *F16F 2228/066* (2013.01); *F16F 2232/08* (2013.01); *F16F 2234/02* (2013.01)

(58) Field of Classification Search
CPC .......... B60G 2500/104; B60G 2500/11; B60G 2600/182; B60G 2600/00; B60G 2600/21; B60G 2800/162; F16F 9/504; F16F 9/185; F16F 9/34; F16F 2222/12; F16F 2228/066; F16F 2232/08; F16F 2234/02
See application file for complete search history.

(56) References Cited

U.S. PATENT DOCUMENTS

| | | | | |
|---|---|---|---|---|
| 6,460,663 | B1* | 10/2002 | Huang | F16F 9/3214 188/266.5 |
| 7,156,214 | B2* | 1/2007 | Pradel | F16F 9/466 248/560 |
| 8,651,252 | B2* | 2/2014 | Katayama | F16F 9/5126 188/322.15 |
| 10,746,247 | B2* | 8/2020 | Slusarczyk | F16F 9/3214 |
| 11,118,648 | B2* | 9/2021 | Yamashita | F16F 9/18 |
| 11,242,906 | B2* | 2/2022 | Im | F16F 9/369 |
| 2002/0020595 | A1* | 2/2002 | Adamek | F16F 9/465 188/280 |
| 2012/0145496 | A1* | 6/2012 | Goetz | F16F 9/464 251/324 |
| 2012/0247888 | A1 | 10/2012 | Chikuma et al. | |
| 2015/0047936 | A1* | 2/2015 | Slusarczyk | F16F 9/512 188/313 |
| 2017/0152910 | A1* | 6/2017 | Schaffelhofer | B60G 13/08 |
| 2017/0219042 | A1* | 8/2017 | Callies | F16F 9/34 |
| 2018/0112736 | A1* | 4/2018 | Luedecke | F16F 9/10 |
| 2020/0032871 | A1 | 1/2020 | Yamashita | |

FOREIGN PATENT DOCUMENTS

| | | |
|---|---|---|
| KR | 10-2015-0142907 | 12/2015 |
| WO | 2018/168865 | 9/2018 |

OTHER PUBLICATIONS

International Search Report issued Apr. 7, 2020 in International Application No. PCT/JP2020/005267 with English translation.
English translation of the Written Opinion of the International Searching Authority issued Apr. 7, 2020 in International Application No. PCT/JP2020/005267.
Office Action issued Jan. 5, 2024 in corresponding German Patent Application No. 112020001540.8, with English translation.

* cited by examiner

DAMPING FORCE ADJUSTABLE SHOCK ABSORBER

TECHNICAL FIELD

The present invention relates to a damping force adjustable shock absorber preferably usable to damp a vibration of a vehicle represented by, for example, a four-wheeled automobile.

BACKGROUND ART

Generally, as a suspension apparatus including a shock absorber capable of adjusting a damping force by driving a damping force adjustment valve provided between a vehicle body side and a wheel side of a vehicle and a controller that controls the driving of the above-described damping force adjustment valve, there is known a suspension apparatus configured in such a manner that the shock absorber is equipped with a frequency adaptive portion that reduces the damping force for a high-frequency vibration (for example, refer to PTL 1). According to this configuration, the frequency adaptive portion can mechanically reduce the damping force for a high-frequency vibration, and can improve ride comfort on the vehicle. Further, the damping force generated by the shock absorber can be variably adjusted by controlling the driving of the damping force adjustment valve using the controller.

CITATION LIST

Patent Literature

PTL 1: Japanese Patent Application Public Disclosure No. 2012-206685

SUMMARY OF INVENTION

Technical Problem

Then, the damping force adjustable shock absorber discussed in PTL 1 has an advantage of being able to mechanically reduce the damping force according to the vibration state of the vehicle, thereby improving the ride comfort on the vehicle. However, one measure currently under consideration with the aim of further improving the ride comfort on the vehicle (the vibration damping performance) is to additionally provide another damping force valve in addition to the above-described damping force adjustment valve and frequency adaptive portion. However, in this case, the axial length of the shock absorber undesirably increases, which poses an object of reducing the axial length of the entire shock absorber.

An object of the present invention is to provide a damping force adjustable shock absorber configured to be able to have a shorter axial length to be formed compactly as a whole and also improve the vibration damping performance.

Solution to Problem

According to an aspect of the present invention, a damping force adjustable shock absorber includes a cylinder sealingly containing hydraulic fluid therein, a piston slidably inserted in this cylinder and dividing an inside of the cylinder into a rod-side chamber and a bottom-side chamber, a piston rod coupled with this piston and extending from an end portion of the cylinder to outside, a flow path in which a flow of the hydraulic fluid is generated due to a movement of the piston rod, and a damping force adjustment valve provided in the flow path and configured to be subjected to an adjustment of an opening/closing operation by a solenoid. A frequency adaptive mechanism is provided in the flow path in series with the damping force adjustment valve. The frequency adaptive mechanism is configured to reduce a damping force for a high-frequency vibration. The frequency adaptive mechanism further includes a second valve mechanism configured to apply a resistance force to a flow of the hydraulic fluid from an upstream-side chamber to a downstream-side chamber.

Advantageous Effects of Invention

According to the damping force adjustable shock absorber according to the one aspect of the present invention, the shock absorber can have a shorter axial length to be formed compactly as a whole and also improve a vibration damping performance (ride comfort on the vehicle).

DESCRIPTION OF EMBODIMENTS

In the following description, a damping force adjustable shock absorber according to an embodiment of the present invention will be described in detail with reference to FIGS. 1 to 8 in the attached drawings based on an example in which it is applied to a damping force adjustable hydraulic shock absorber.

Figure 1:
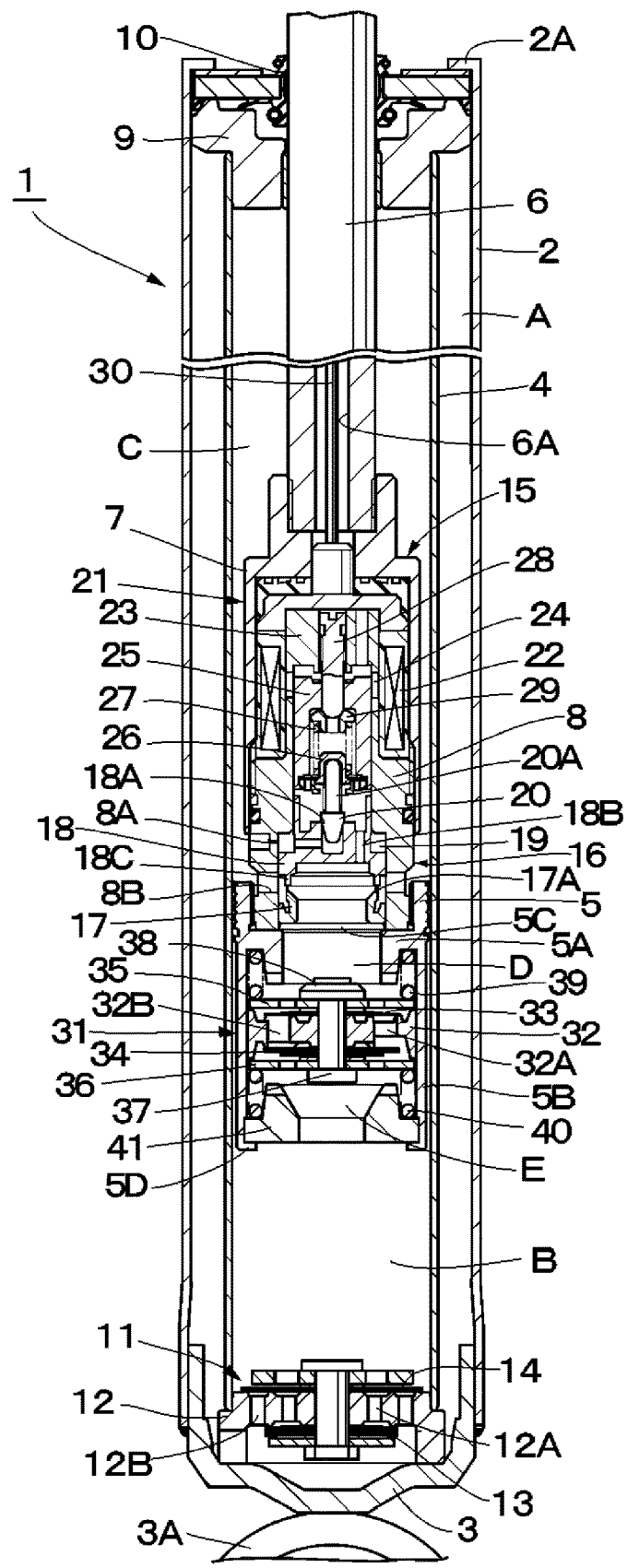
FIG. 1 is a vertical cross-sectional view illustrating a damping force adjustable shock absorber according to an embodiment of the present invention.

In FIG. 1, a damping force adjustable hydraulic shock absorber 1 (hereinafter referred to as a hydraulic shock absorber 1) includes, for example, an outer cylinder 2, an inner cylinder 4, a piston 5, a piston rod 6, a rod guide 9, a bottom valve 11, a damping force adjustment device 15 (a damping force adjustment valve 16), a frequency adaptive mechanism 31, a compression-side damping force generation valve 33, and an extension-side damping force generation valve 34, which will be described below. The generated damping force of the hydraulic shock absorber 1 is variably adjusted by the damping force adjustment device 15 (the damping force adjustment valve 16) according to a control instruction issued from outside.

The bottomed cylindrical outer cylinder 2, which forms the outer shell of the hydraulic shock absorber 1, has one end (lower end) side closed by a bottom cap 3 using a welding method or the like, and the other end (upper end) side formed as a radially inward bent crimped portion 2A. The outer cylinder 2 forms a cylinder together with the inner cylinder 4, which will be described below. Further, a mounting eye 3A, which is attached to, for example, a wheel side of the vehicle, is provided on the bottom cap 3.

The inner cylinder 4 is located on the radially inner side of the outer cylinder 2, and is provided coaxially with the outer cylinder 2. This inner cylinder 4 forms the cylinder together with the outer cylinder 2. The inner cylinder 4 has a bottom (lower) end side fittedly attached to a valve body 12 of the bottom valve 11 and an upper end side fittedly attached to the rod guide 9. Hydraulic liquid as hydraulic fluid is sealingly contained in the inner cylinder 4. Not only hydraulic oil and oil but also, for example, water mixed with an additive can be used as the hydraulic liquid.

An annular reservoir chamber A is defined between the inner cylinder 2 and the outer cylinder 4, and gas is sealingly contained in this reservoir chamber A together with the above-described hydraulic liquid. This gas may be air in an atmospheric-pressure state, or gas such as compressed nitrogen gas may be used as it. The gas sealingly contained in the reservoir chamber A has a function of compensating for a volume change corresponding to an entry (exist) volume of the piston rod 6 entering or exiting the inner cylinder 4 by being compressed or expanded.

The piston 5 is provided so as to be fittedly inserted in a slidable manner in the inner cylinder 4. This piston 5 divides the inside of the inner cylinder 4 into a bottom-side chamber on one side (i.e., a bottom-side oil chamber B) and a rod-side chamber on the other side (i.e., a rod-side oil chamber C). An annular step 5A and a cylindrical extension portion 5B are provided on the lower surface (the one side) of the piston 5. The annular step 5A protrudes radially inward. The cylindrical extension portion 5B extends from the position of this annular step 5A downward (i.e., toward the bottom-side oil chamber B). The cylindrical extension portion 5B is formed so as to have a smaller diameter than the inner diameter of the inner cylinder 4, and a free piston 32, which will be described below, is axially (vertically) movably contained inside the cylindrical extension portion 5B.

An oil passage 5C is provided on the radially inner side of the piston 5 (the annular step 5A and the cylindrical extension portion 5B). The oil passage 5C serves as a flow path that allows communication to be established between the bottom-side oil chamber B and the rod-side oil camber C via a valve case 8, which will be described below. The frequency adaptive mechanism 31 is provided in this oil passage 5C in series with the damping force adjustment valve 16, which will be described below. More specifically, the damping force adjustment valve 16 is provided at a position on the upper side of the piston 5 in the inner cylinder 4, and the frequency adaptive mechanism 31 is provided at a position on the lower side of the piston 5 in the inner cylinder 4. The cylindrical extension portion 5B of the piston 5 includes a crimped portion 5D on the lower end (one end) side thereof, and this crimped portion 5D functions to fix a spring bearing stopper 41, which will be described below, in the cylindrical extension portion 5B in a state of being prevented from being detached off.

The piston rod 6 is coupled with the piston 5 via a solenoid case 7 and the valve case 8. An axially extending wiring hole 6A is formed on the central side of the piston rod 6, and an electric wiring (a harness 30), which will be described below, is inserted through in this wiring hole 6A. Then, the cylindrical solenoid case 7 and the valve case 8 are integrally provided on one end side (the lower end side) of the piston rod 6 axially extending in the inner cylinder 4. The solenoid case 7 and the valve case 8 are also structured to form a part of the piston rod 6.

In this case, the piston 5 is fixed on one end (the lower end) side of the valve case 8 in a fastened state using a method such as threadable engagement. The other end (the upper end) side of the piston rod 6 protrudes so as to extend out of the outer cylinder 2 and the inner cylinder 4 via the rod guide 9 and the like. The cylindrical solenoid case 7 is used as a connection member for coupling (integrating) the lower end side of the piston rod 6 with the valve case 8.

The valve case 8 forms a fixed iron core of a solenoid 21 together with a stator core 23, which will be described below, and also forms the outer shell portion of the damping force adjustment valve 16. The valve case 8 is made from a magnetic material (for example, a ferrous material) as a stepped cylindrical member, and a plunger 25, which will be described below, is fittedly inserted on the inner peripheral side thereof in a slidably displaceable manner. Further, a valve seat member 17 and a setting pressure-variable main valve body 18, which will be described below, are provided so as to be fitted inside the one side (the lower portion side) of the valve case 8 at positions lower than the plunger 25. Then, on the one side (the lower portion side) of the valve case 8, an orifice passage 8A is provided at a position that brings the rod-side oil chamber C into communication with a bottomed hole 18A, which will be described below, and a plurality of radial oil holes 8B is provided at positions that bring the rod-side oil chamber C into communication with the oil passage 5C in the piston 5 via the main valve body 18 (an annular valve portion 18C), which will be described below (i.e., positions radially facing the annular valve portion 18C and the annular valve seat 17A).

The stepped cylindrical rod guide 9 is provided on the upper end side of the inner cylinder 4 as illustrated in FIG. 1. The rod guide 9 has a function of positioning the upper end portion of the inner cylinder 4 at the center of the outer cylinder 2, and also axially slidably guiding the piston rod 6 on the inner peripheral side thereof. An annular seal member 10 is provided between the crimped portion 2A of the outer cylinder 2 and the rod guide 9. This seal member 10 seals between the seal member 10 and the piston rod 6 with the aid of a sliding contact of the inner peripheral side thereof with the outer peripheral side of the piston rod 6, thereby preventing the hydraulic oil in the outer cylinder 2 and the inner cylinder 4 from leaking outward.

The bottom valve 11 is located on the lower end side of the inner cylinder 4, and is provided between the bottom cap 3 and the inner cylinder 4. As illustrated in FIG. 1, the bottom valve 11 includes the valve body 12, a compression-side disk valve 13, and an extension-side check valve 14. The valve body 12 defines the reservoir chamber A and the bottom-side oil chamber B between the bottom cap 3 and the inner cylinder 4. The compression-side disk valve 13 is provided on the lower surface side (one axial side) of the valve body 12. The extension-side check valve 14 is provided on the upper surface side (the other axial side) of the valve body 12. Oil paths 12A and 12B are formed on the valve body 12 at circumferential intervals from each other, and these oil paths 12A and 12B are passages that allow communication to be established between the reservoir chamber A and the bottom-side oil chamber B.

Then, the compression-side disk valve 13 is opened if the pressure in the bottom-side oil chamber B exceeds a relief setting value when the piston 5 is slidably displaced downward during a compression stroke of the piston rod 6, and relieves the hydraulic oil (the pressure) at this time to the reservoir chamber A side via each of the oil paths 12A. As this relief setting value, a valve-opening pressure is set in relation to a pressure or the like when the damping force adjustment device 15, which will be described below, is set to a hard side.

The extension-side check valve 14 is opened when the piston 5 is slidably displaced upward during an extension stroke of the piston rod 6, and otherwise is closed. This extension-side check valve 14 permits the hydraulic oil (the hydraulic fluid) in the reservoir chamber A to flow through inside each of the oil paths 12B toward the bottom-side oil chamber B, and prohibits the hydraulic liquid from flowing in the opposite direction therefrom. The valve-opening pressure of the extension-side check valve 14 is set to a lower valve-opening pressure than a pressure when the damping force adjustment device 15, which will be described below, is set to a soft side, and substantially generates no damping force.

Figure 2:
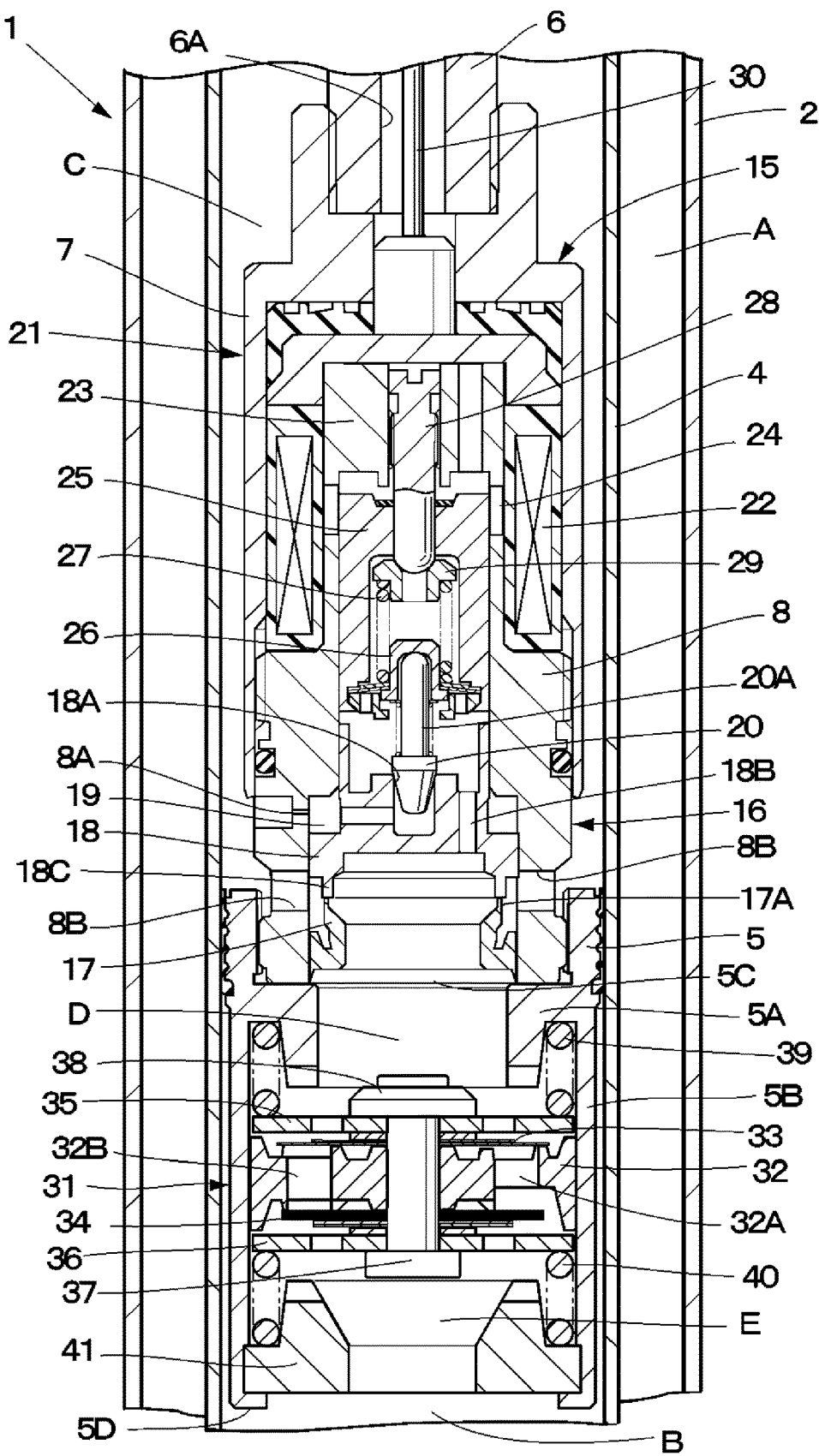
FIG. 2 is a cross-sectional view of main parts that illustrates a damping force adjustment device, a frequency adaptive mechanism, compression-side and extension-side damping force generation valves, and the like illustrated in FIG. 1 in an enlarged manner.
Figure 3:
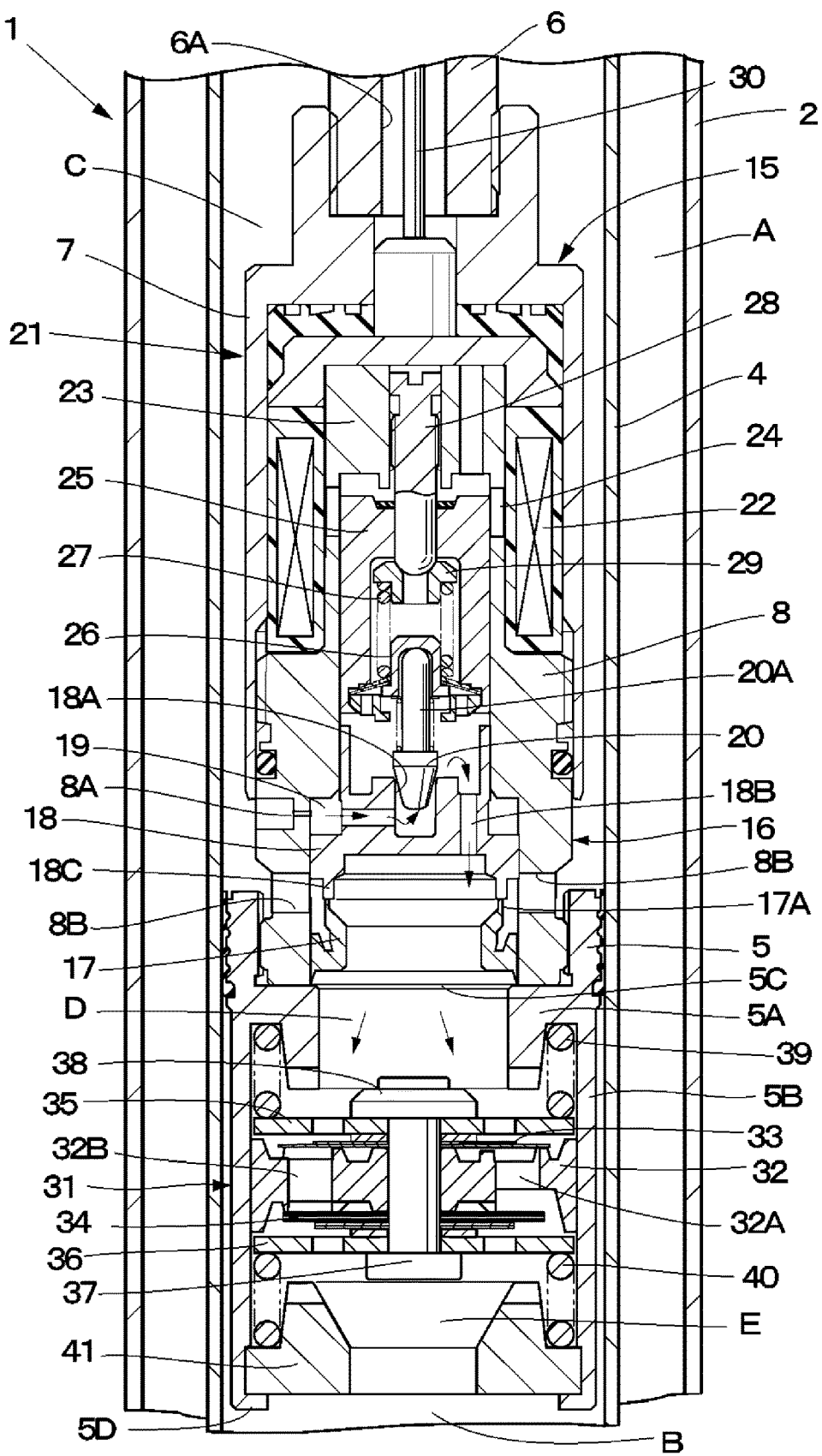
FIG. 3 is a cross-sectional view of main parts at a similar position to FIG. 2 that illustrates them with a poppet valve body opened by energizing a solenoid.

Next, the damping force adjustment device 15 as a damping force adjustment mechanism that variably adjusts the generated damping force of the hydraulic shock absorber 1 will be described with reference to FIGS. 1 to 3.

The damping force adjustment device 15 is arranged between the piston 5 and the piston rod 6 in the inner cylinder 4. More specifically, the damping force adjustment device 15 has one end side (the lower end side of the valve case 8 illustrated in FIG. 2) provided fixedly to the upper end side of the piston 5, and the other end side (the upper end side of the solenoid case 7 illustrated in FIG. 2) provided fixedly to the lower end side of the piston rod 6. The damping force adjustment device 15 controls a flow of the hydraulic oil between the bottom-side oil chamber B and the rod-side oil chamber C in the inner cylinder 4 by the damping force adjustment valve 16, thereby variably adjusting the damping force generated at this time. More specifically, the damping force adjustment valve 16 is configured in such a manner that the generated damping force is variably controlled based on an adjustment of the valve-opening pressure of the setting pressure-variable main valve body 18, which will be described below, by a damping force variable actuator (the solenoid 21).

Then, the damping force adjustment valve 16 includes the above-described valve case 8, the valve seat member 17, the lidded cylindrical main valve body 18, an annular back-pressure chamber 19, and a poppet valve body 20. The valve case 8 has the one end (the lower end) side fixedly attached to the upper end side of the piston 5, and the other end (the upper end) side protruding axially upward into the solenoid case 7. The valve seat member 17 is provided fixedly to the inner periphery of the lower end side of the valve case 8, and has an upper end side that serves as the annular valve seat 17A. The main valve body 18 is located above this valve seat member 17, and is fittedly inserted in a slidable manner in the valve case 8. The back-pressure chamber 19 is formed so as to extend circumferentially between the valve case 8 and the main valve body 18 so as to press this main valve body 18 toward the lower-side valve seat member 17 with a pilot pressure. The poppet valve body 20 functions as a pilot valve member that variably sets the pilot pressure (the back pressure) in this back-pressure chamber 19 according to power supply (a current value applied) to the solenoid 21, thereby adjusting the valve-opening pressure of the main valve body 18.

The main valve body 18 of the damping force adjustment valve 16 is a setting pressure-variable valve body set to a valve-opening pressure adjusted according to the opening degree of the poppet valve body 20. Then, the bottomed hole 18A, a through-hole 18B, and the annular valve portion 18C are provided to the main valve body 18. The bottomed hole 18A is opened and closed by the poppet valve 20 being separated therefrom and seated thereon. The through-hole 18B is disposed at a position spaced apart in the radial direction of this bottomed hole 18A, and extends in the axial direction of the main valve body 18. The annular valve portion 18C is formed by an annular protrusion formed on the lower surface (the one surface) side of the main valve body 18. When the main valve body 18 is displaced vertically (axially), the annular valve portion 18C is separated from and seated on the annular valve seat 17A of the valve seat member 17, and thereby the main valve body 18 establishes and blocks (opens and closes) the communication between the oil passage 5C and the oil holes 8B.

The back-pressure chamber 19 of the damping force adjustment valve 16 is constantly in communication with the rod-side oil chamber C via the orifice passage 8A of the valve case 8, and is also constantly in communication with the bottomed hole 18A of the main valve body 18. Therefore, the pressure in the back-pressure chamber 19 (the pilot pressure) is set to a pressure equal to the rod-side oil chamber C while the poppet valve body 20 closes the bottomed hole 18A. However, as illustrated in FIG. 3, when the poppet valve body 20 opens the bottomed hole 18A, the pressure in the back-pressure chamber 19 (the pilot pressure) is variably adjusted so as to reduce to a pressure according to the opening degree of the poppet valve 20.

The main valve body 18 of the damping force adjustment valve 16 receives a pressure in the direction in which the annular valve portion 18C of the main valve body 18 is seated onto the annular valve seat 17A (i.e., a valve-closing direction) due to the pilot pressure (the back-pressure) from the back-pressure chamber 19. More specifically, the main valve body 18 receives the pressure in the rod-side oil chamber C via the oil holes 8B of the valve case 8, and the annular valve portion 18C of the main valve body 18 is separated from the annular valve seat 17A (displaced upward) to be opened when this pressure exceeds the pilot pressure (the back-pressure) on the back-pressure chamber 19 side.

In this case, the valve-opening pressure of the main valve body 18 is variably set based on the adjustment of the pilot pressure (the back-pressure) in the back-pressure chamber 19 via the poppet valve 20. When the annular valve portion 18C of the main valve body 18 is separated (opened) from the annular valve seat 17A of the valve seat member 17, the hydraulic oil from the rod-side oil chamber C flows from each of the oil holes 8B into the oil passage 5C of the piston 5 via the annular valve portion 18C of the main valve body 18 (the annular valve seat 17A of the valve seat member 17). Then, the hydraulic oil at this time flows from an upper-portion chamber D, which will be described below, into a lower-portion chamber E and the bottom-side oil chamber B via a second oil path 32B of the free piston 32 and the extension-side damping force generation valve 34.

Next, the solenoid 21 forms the damping force adjustment device 15 together with the damping force adjustment valve 16, and is used as the damping force variable actuator. As illustrated in FIG. 2, the solenoid 21 includes a cylindrical coil 22, the stator core 23, and a cylindrical nonmagnetic portion 24. The coil 22 generates a magnetic force in reaction to power supply from outside. The stator core 23 serves as the first fixed iron core located on the inner peripheral side of this coil 22 and disposed so as to be axially spaced apart from the upper end of the above-described valve case 8. The nonmagnetic portion 24 is interposed between the upper end of the valve case 8 (a second fixed iron core) located on the inner peripheral side of the coil 22 and the lower end of the stator core 23 (the first fixed iron core), and magnetically closes off them therebetween.

Further, the solenoid 21 includes the plunger 25, a spring bearing member 26, a biasing spring 27, an adjustment rod 28, a movable spring bearing 29, the above-described solenoid case 7, and the like. The plunger 25 serves as a variable iron core provided axially movably on the inner peripheral side of the valve case 8. The spring bearing member 26 is provided on the central side of this plunger 25, and can move while following the plunger 25. The biasing spring 27 is arranged in the plunger 25 so as to constantly bias this spring bearing member 26 in one direction (downward). The adjustment rod 28 is provided threadably with the central side of the stator core 23, and adjusts the biasing force of this biasing spring 27. The movable spring bearing 29 is located inside the plunger 25, and is disposed between this adjustment rod 28 and the biasing spring 27. The solenoid case 7 serves as a cover member covering the outer periphery of the coil 22.

Now, the upper end portion of the valve case 8 forms the other stator core (the second fixed iron core) opposite of the nonmagnetic portion 24 from the lower end of the stator core 23. The nonmagnetic portion 24 is disposed between the upper-portion side of the valve case 8 and the stator core 23 (i.e., between the first fixed core and the second fixed core) on the inner peripheral side of the coil 22 so as to increase the magnetic flux density of a magnetic circuit with respect to the movable iron core (the plunger 25).

The solenoid case 7 forms a yoke made from a magnetic material, and defines the magnetic circuit on the outer peripheral side of the coil 22. The solenoid case 7 surrounds the coil 22, the stator core 23, the upper-portion side of the valve case 8, and the like of the solenoid 21 from outside, thereby forming the outer shell of the solenoid 21. A shaft portion 20A of the poppet valve body 20 is inserted inside the spring member 26. The biasing spring 27 biases the poppet valve body 20 toward the bottomed hole 18A of the main valve body 18 together with the spring bearing member 26. The biasing force of the biasing spring 27 is variably adjusted by changing the position at which the adjustment rod 28 is threadably engaged with the stator core 23. Further, the main valve body 18 is also biased by the biasing spring 27 toward the annular valve seat 17A side of the valve seat member 17 via the poppet valve body 20.

The axially extending wiring hole 6A is provided on the inner peripheral side of the piston rod 6, and the electric wiring (hereinafter referred to as the harness 30) is inserted in the wiring hole 6A from the protrusion end side of the piston rod 6. The end portion of this harness 30 is connected to a controller (not illustrated) as a control device outside the piston rod 6 (for example, the vehicle body side). The coil 22 of the solenoid 21 is energized according to the control of the power supply by this controller via the harness 30, and the solenoid 21 is brought into a deenergized state (namely a demagnetize state) when the power supply is stopped.

The solenoid 21 generates a magnetic force that attracts the plunger 25 toward the stator core 23 side when the coil 22 is energized. Due to this magnetic force, the spring bearing member 26 is displaced together with the plunger 25 in a direction for compressing the biasing spring 27. Therefore, the poppet valve body 20 moves in the valve-opening direction so as to be separated from the bottomed hole 18A of the main valve body 18.

More specifically, an axial thrust force proportional to the power supply (the current value applied) to the coil 22 is generated on the plunger 25 of the solenoid 21, and the poppet valve 20 opens the bottomed hole 18A of the main valve body 18. Therefore, the pilot pressure (the back-pressure) in the back-pressure chamber 19 is set variably in correspondence with the thrust force of the plunger 25 due to the displacement of the poppet valve body 20. As a result, the valve-opening pressure of the main valve body 18 opened against the pressure in the back-pressure chamber 19 is variably adjusted by axially displacing the poppet valve body 20 according to the power supply to the solenoid 21.

More specifically, the valve-opening pressure of the main valve body 18 is raised or lowered by causing the above-described controller to control the current value to apply to the coil 22 of the solenoid 21 to axially displace the poppet valve body 20. Therefore, the generated damping force of the hydraulic shock absorber 1 can be adjusted variably according to the valve-opening pressure of the main valve body 18 proportional to the power supply (the current value applied) to the solenoid 21. The poppet valve body 20 of the damping force adjustment valve 16 is configured as a normally-closed valve, and is normally closed in the deenergized state and opened when the solenoid 21 is energized.

The frequency adaptive mechanism 31 is provided on the lower side of the piston 5 via the cylindrical extension portion 5B. As illustrated in FIGS. 1 to 3, this frequency adaptive mechanism 31 includes the free piston 32, the compression-side damping force generation valve 33, the extension-side damping force generation valve 34, upper and lower retainers 35 and 36, a bolt 37, and a nut 38. The free piston 32 is provided vertically relatively displaceably in the cylindrical extension portion 5B. The compression-side damping force generation valve 33 is formed by a disk valve provided on the upper surface side of this free piston 32. The extension-side damping force generation valve 34 is formed by another disk valve provided on the lower surface side of the free piston 32.

A first oil path 32A and a second oil path 32B are provided on the free piston 32 so as to be spaced apart from each other. The first oil path 32A and the second oil path 32B are communicable with the oil passage 5C of the piston 5. Then, the first oil path 32A is constantly in communication with the bottom-side oil chamber B (the lower-portion chamber E, which will be described below), and the oil passage 5C of the piston 5 (the upper-portion chamber D, which will be described below) is brought out of communication with the first oil path 32A (the lower-portion chamber E and the bottom-side oil chamber B) when the compression-side damping force generation valve 33 is closed. However, the oil passage 5C of the piston 5 is brought into communication with the first oil path 32A (the lower-portion chamber E and the bottom-side oil chamber B) when the compression-side damping force generation valve 33 is opened during the compression stroke of the piston rod 6.

On the other hand, the second oil path 32B is constantly in communication with the oil passage 5C of the piston 5, and the oil passage 5C of the piston 5 (the second oil path 32B) is brought out of communication with the lower-portion chamber E and the bottom-side oil chamber B when the extension-side damping force generation valve 34 is closed. However, the oil passage 5C of the piston 5 (the second oil path 32B) is brought into communication with the lower-portion chamber E and the bottom-side oil chamber B when the extension-side damping force generation valve 34 is opened during the extension stroke of the piston rod 6.

A second valve mechanism (i.e., the compression-side damping force generation valve 33 and the extension-side damping force generation valve 34) is provided to the frequency adaptive mechanism 31 in the inner cylinder 4. The second valve mechanism applies a resistance force to a flow of the hydraulic fluid from the upstream-side chamber to the downstream-side chamber. Then, the compression-side damping force generation valve 33 provided on the upper surface side of the free piston 32 is opened when the piston 5 (the free piston 32) is downward slidably displaced during the compression stroke of the piston rod 6, and is otherwise kept in a valve-closed state.

On the other hand, the extension-side damping force generation valve 34 provided on the lower surface side of the free piston 32 is opened if the pressure in the oil passage 5C of the piston 5 exceeds the valve-opening setting pressure when the piston 5 (the free piston 32) is upward slidably displaced during the extending (extension) stroke of the piston rod 6, and allows the hydraulic oil at this time to flow toward the lower-portion chamber E and bottom-side oil chamber B side via the second oil path 32B. The extension-side damping force generation valve 34 is kept in a valve-closed state during the compression stroke of the piston rod 6.

The frequency adaptive mechanism 31 includes the upper and lower retainers 35 and 36. The upper and lower retainers 35 and 36 are provided so as to sandwich the free piston 32, the compression-side damping force generation valve 33, and the extension-side damping force generation valve 34 vertically therebetween. The upper and lower retainers 35 and 36 are fixed to both the upper and lower sides of the free piston 32 with use of the bolt 37 and the nut 38 in this state. As a result, the free piston 32 is assembled as an assembled unit (an assembly) including the compression-side damping force generation valve 33, the extension-side damping force generation valve 34, the upper and lower retainers 35 and 36, the bolt 37, and the nut 38. At this time, the compression-side damping force generation valve 33 is positioned on the upper surface side of the free piston 32 via the upper-side retainer 35, and the extension-side damping force generation valve 34 is positioned on the lower surface side of the free piston 32 via the lower-side retainer 36.

Further, an upper-side spring 39 as a biasing member is provided in a compressed (elastic) and deformed state between the annular step 5A of the piston 5 and the upper-side retainer 35. A lower-side spring 40 as another biasing member is provided in a compressed (elastic) and deformed state between the spring bearing stopper 41 and the lower-side retainer 36. The upper-side spring 39 and the lower-side spring 40 are elastic members (i.e., biasing members) that form a resistive element of the frequency adaptive mechanism 31, and permit the assembly of the free piston 32 (i.e., the compression-side damping force generation valve 33, the extension-side damping force generation valve 34, the upper and lower retainers 35 and 36) to be vertically relatively displaced on the inner peripheral side of the cylindrical extension portion 5B. The biasing forces of the upper-side spring 39 and the lower-side spring 40 are also factors that determine a cutoff frequency (not illustrated) at which the characteristic of the damping force derived from the frequency adaptive mechanism 31 is switched from a hard state to a soft state.

When the free piston 32 is upward displaced in the cylindrical extension portion 5B, the upper-side spring 39 is elastically compressed and deformed between the annular step 5A of the piston 5 and the upper-side retainer 35. The upper-side spring 39 at this time generates a resistance force against the upward displacement of the free piston 32 toward a stroke end. Further, when the free piston 32 is downward displaced in the cylindrical extension portion 5B, the lower-side spring 40 is elastically compressed and deformed between the lower-side retainer 36 and the spring bearing stopper 41. The lower-side spring 40 at this time generates a resistance force against the downward displacement of the free piston 32 toward a stroke end.

For the free piston 32, which is axially relatively displaced in the cylindrical extension portion 5B, the stroke ends thereof in the vertical direction are defined by abutment of the upper and lower retainers 35 and 36 with the annular step 5A and the spring bearing stopper 41, respectively. The assembly of the free piston 32 (i.e., the compression-side damping force generation valve 33, the extension-side damping force generation valve 34, and the upper and lower retainers 35 and 36) divides the inside of the cylindrical extension portion 5B into the upper-portion chamber D and the lower-portion chamber E, which are two chambers on the upstream side and the downstream side.

With the compressions-side damping force generation valve 33 and the extension-side damping force generation valve 34 closed, a flow so as to replace the oil between the bottom-side oil chamber B and the rod-side oil chamber C is not generated in the upper-portion chamber D and the lower-portion chamber E defined as the two chambers by the free piston 32. However, while the free piston 32 is moving relative to the cylindrical extension portion 5B, the oil in the rod-side oil chamber C flows into the upper-portion chamber D and an equal amount of oil is pushed out from the lower-portion chamber E toward the bottom-side oil chamber B side, and therefore a flow is substantially generated.

Now, during the extension stroke of the piston rod 6, the volume in the upper-portion chamber D is expanded due to the displacement (elastic deformation) of the free piston 32 (the compression-side damping force generation valve 33, the extension-side damping force generation valve 34, and the upper and lower retainers 35 and 36) and the lower-side spring 40. In this expansion range, the hydraulic oil in the oil passage 5C of the piston 5 flows toward inside the upper-portion chamber D. Therefore, the pressure in the back-pressure chamber 19 relatively reduces due to the displacement of the free valve 32, and the valve-opening set pressure of the main valve body 18 is lowered according thereto. As a result, regarding the damping force characteristic of the hydraulic shock absorber 1, the characteristic of the generated damping force is switched from the hard state (states expressed by characteristic lines 42 and 44 indicated by solid lines in FIG. 4) to the soft state (states expressed by characteristic lines 43 and 45 indicated by dotted lines in FIG. 4) according to a vibration frequency of the vehicle.

In this manner, the free valve 32 operates as a frequency adaptive valve that adjusts the inner pressure in the upper-portion chamber D (i.e., the back-pressure chamber 19) according to the vibration frequency of the vehicle (i.e., the vibration frequency of the piston rod 6 and/or the inner cylinder 4). For the main valve body 18 of the damping force adjustment valve 16, the pressure in the back-pressure chamber 19 does not relatively reduce by the free piston 32 and the valve-opening setting pressure of the main valve body 18 is kept at a relatively high pressure when the vibration frequency of the piston rod 6 and/or the inner cylinder 4 is a frequency lower than the above-described cutoff frequency as expressed by, for example, the characteristic lines 42 and 44 indicated by the solid lines in FIG. 4.

However, at the time of a high frequency when the above-described vibration frequency matches or exceeds the above-described cutoff frequency (for example, when the vehicle is running on a bad-conditioned road), the pressure in the back-pressure chamber 19 relatively reduces by the free piston 32 and the valve-opening setting pressure of the main valve body 18 is lowered according thereto. Therefore, the characteristic of the generated damping force is switched from the hard characteristic to the soft characteristic, for example, like from the characteristic lines 42 and 44 indicated by the solid lines to the characteristic lines 43 and 45 indicated by the dotted lines in FIG. 4. The characteristic line 44 is not only a characteristic accompanying the opening/closing of the main valve body 18 but also a characteristic accompanying the opening/closing of the extension-side damping force generation valve 34.

Figure 4:
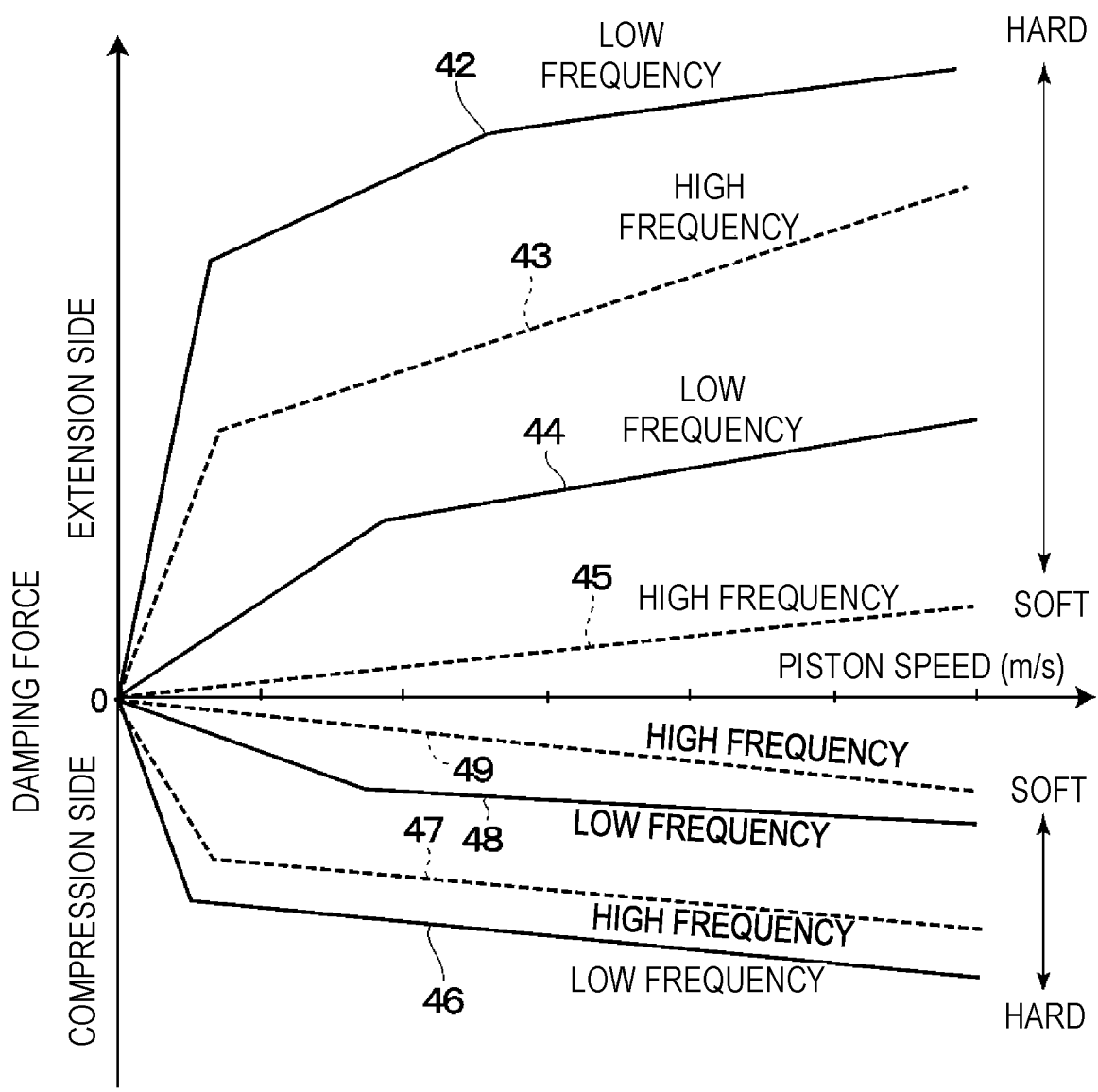
FIG. 4 illustrates characteristic lines representing the relationship between a piston speed and a generated damping force of the damping force adjustable shock absorber.

The characteristic lines 42, 44, 46, and 48 indicated by the solid lines in FIG. 4 are characteristics in a state that the vibration frequency of the vehicle (the vibration frequency of the piston rod 6 and/or the inner cylinder 4) is a frequency lower than the above-described cutoff frequency (for example, when the vehicle is running on a good-conditioned road or when the vibration frequency is a low frequency even if the vehicle is running on a bad-conditioned road). On the other hand, the characteristic lines 43, 45, 47, and 49 indicated by the dotted lines are characteristics in a state that the vibration frequency of the vehicle is a high frequency equal to or higher than the above-described cutoff frequency (for example, when the vehicle is running on a bad-conditioned road). Further, the characteristic lines 42 to 45 express a damping force characteristic on the extension side (stroke) of the piston rod 6. On the other hand, the characteristic lines 46 to 49 express a damping force characteristic on the compression side (stroke) of the piston rod 6.

The spring bearing stopper 41 is fixed to the cylindrical extension portion 5B of the piston 5 at the lower end side thereof in the state of being prevented from being detached off by the crimped portion 5D. The spring bearing stopper 41 keeps the lower-side spring 40 in a compressed (elastic) and deformed state between the spring bearing stopper 41 and the lower-side retainer 36. Then, when the free piston 32 is displaced downward in the cylindrical extension portion 5B, the lower-side spring 40 is elastically compressed and deformed to a position at which the lower-side retainer 36 abuts against the spring bearing stopper 41, and the sprint bearing stopper 41 defines the stroke end of the free piston 32 by abutting against the retainer 36 in this state.

The damping force adjustable hydraulic shock absorber 1 according to the present embodiment is configured in the above-described manner, and the operation thereof will be described next.

When the hydraulic shock absorber 1 is mounted onto the vehicle, the upper end side of the piston rod 6 is attached to the vehicle body side of the vehicle, and the mounting eye 3A is attached to the wheel side on the bottom cap 3 side of the outer cylinder 2. When the vehicle is running, upon occurrence of a vertical vibration due to unevenness of a road surface or the like, the piston rod 6 is displaced so as to be extended from or compressed into the inner cylinder 4, by which the hydraulic shock absorber 1 can generate the damping force by the damping force adjustment device 15 (the damping force adjustment valve 16 and the solenoid 21), the frequency adaptive mechanism 31, the compression-side damping force generation valve 33, the extension-side damping force generation valve 34, and the like, thereby succeeding to damp the vibration of the vehicle.

More specifically, during the compression stroke of the piston rod 6, the piston rod 6 enters the inner cylinder 4 and the pressure in the bottom-side oil chamber B exceeds the pressure in the rod-side oil chamber C. Therefore, the hydraulic oil in the bottom-side oil chamber B flows from the lower-portion chamber E into the first oil path 32A, and this inflow oil flows into the rod-side oil chamber C via the compression-side damping force generation valve 33 and the main valve body 18. At this time, the damping force for the compression stroke is generated by, for example, the main valve body 18 and the compression-side damping force generation valve 33. Further, the hydraulic oil in the bottom-side oil chamber B flows to the reservoir chamber A side via the bottom valve 11 (the compression-side disk valve 13) by an amount corresponding to the volume of the piston rod 6 that enters the inner cylinder 4 during the compression stroke.

On the other hand, during the extension stroke of the piston rod 6, the pressure in the rod-side oil chamber C exceeds the pressure in the bottom-side oil chamber B, and therefore the hydraulic oil in the rod-side oil chamber C flows from the oil holes 8B of the valve case 8 into the oil passage 5C of the piston 5 via the main valve body 18. This inflow oil is introduced from the oil passage 5C of the piston 5 (the upper portion chamber D) into the second oil path 32B of the free piston 32, and flows into the lower-portion chamber E and the bottom-side oil chamber B when the extension-side damping force generation valve 34 is opened.

On the main valve body 18 of the damping force adjustment valve 16, a pressure difference is generated between the rod-side oil chamber C (the oil holes 8B) and the back-pressure chamber 19 when the hydraulic oil from the rod-side oil chamber C is introduced from the orifice passage 8A of the valve case 8 into the oil passage 5C via the back-pressure chamber 19, the bottomed hole 18A of the main valve body 18, the poppet valve body 20, the through-hole 18B, and the like during the extension stroke of the piston rod 6. Then, when this pressure difference increases to a pressure equal to or higher than a predetermined valve-opening setting pressure, the annular valve portion 18C of the main valve body 18 is separated from the annular valve seat 17A, and therefore the main valve body 18 applies resistance to the hydraulic oil flowing between the annular valve portion 18C and the annular valve seat 17A, thereby generating a predetermined extension-side damping force.

Now, the frequency adaptive mechanism 31 is equipped with the free piston 32 as the frequency adaptive valve that adjusts the inner pressure in the upper-portion chamber D (i.e., the back-pressure chamber 19) according to the vibration frequency of the piston rod 6 and/or the inner cylinder 4. More specifically, during the extension stroke of the piston rod 6, the hydraulic oil in the oil passage 5C of the piston 5 flows toward the upper-portion chamber D when the free piston 32 is displaced downward in the cylindrical extension portion 5B of the piston 5 according to the vibration of the vehicle. Therefore, the pressure in the back-pressure chamber 19 relatively reduces due to the displacement of the free valve 32, and the valve-opening set pressure of the main valve body 18 is lowered according thereto.

In this case, for the main valve body 18 of the damping force adjustment valve 16, the pressure in the back-pressure chamber 19 does not relatively reduce by the free piston 32 and the valve-opening setting pressure of the main valve body 18 is kept at a relatively high pressure when the vibration frequency of the piston rod 6 and/or the inner cylinder 4 is a frequency lower than the above-described cutoff frequency as expressed by the characteristic lines 42 and 44 indicated by the solid lines in FIG. 4. However, at the time of a high frequency when the above-described vibration frequency increases to a pressure equal to or higher than the above-described cutoff frequency (for example, when the vehicle is running on a bad-conditioned road), the pressure in the back-pressure chamber 19 relatively reduces by the free piston 32 and the valve-opening setting pressure of the main valve body 18 is lowered, whereby the characteristic of the generated damping force is switched to the soft state as expressed by the characteristic lines 43 and 45 indicated by the dotted lines in FIG. 4.

Further, during the extension stroke of the piston rod 6, while the solenoid 21 of the damping force adjustment device 15 is deenergized (i.e., the current is set to zero), the poppet valve body 20 is kept seated on the bottomed hole 18A of the main valve body 18 under the biasing force by the biasing spring 27 that is transmitted from the spring bearing member 26, and the bottomed hole 18A is disconnected from the through-hole 18B. Therefore, the pilot pressure (the back-pressure) in the back-pressure chamber 19 is kept at a high pressure equivalent to the rod-side oil chamber C due to the closed poppet valve body 20, and the main valve body 18 of the damping force adjustment valve 16 is closed, by which the generated damping force is set to the hard state as expressed by the characteristic line 42.

However, when power is supplied from outside (i.e., the above-described controller) to the coil 22 of the damping force adjustment device 15 to bring the solenoid 21 from the deenergized state into the energized state, a magnetic force for attracting the plunger 25 toward the stator core 23 side is generated. As a result, the spring bearing member 26 is displaced together with the plunger 25 in the direction for compressing the biasing spring 27, and the poppet valve body 20 moves in the valve-opening direction so as to be separated from the bottomed hole 18A of the main valve body 18. At this time, the poppet valve body 20 opens the bottomed hole 18A of the main valve body 18, and therefore the pilot pressure (the back-pressure) in the back-pressure chamber 19 is variably set in correspondence with the thrust force of the plunger 25 (the opening degree of the poppet valve body 20) due to the displacement of the poppet valve body 20.

In this manner, the valve-opening pressure of the main valve body 18 is raised or lowered by causing the above-described controller to control the current value to apply to the coil 22 of the solenoid 21 to thus axially displace the poppet valve body 20. Therefore, the generated damping force of the hydraulic shock absorber 1 can be adjusted variably according to the valve-opening pressure of the main valve body 18 proportional to the power supply (the current value applied) to the solenoid 21. In other words, the generated damping force derived from the damping force adjustment valve 16 can be switched from the hard characteristic (for example, the characteristic line 42) to the soft characteristic (for example, the characteristic line 44) by supplying power from outside to the coil 22 of the damping force adjustment device 15 to energize the solenoid 21.

In addition, according to the present embodiment, the frequency adaptive mechanism 31, which is provided in series with the damping force adjustment valve 16 in the inner cylinder 4, is equipped with the second valve mechanism (for example, the extension-side damping force generation valve 34) that applies the resistance force to the flow of the hydraulic fluid from the upstream-side chamber (for example, the upper-portion chamber D) to the downstream-side chamber (for example, the lower-portion chamber E). Therefore, in the state that the solenoid 21 is energized by power supply from outside and the generated damping force derived from the damping force adjustment valve 16 is switched to the soft characteristic, a hydraulic resistance force (a predetermined damping force) can be generated against the hydraulic oil flowing from the upper-portion chamber D to the lower-portion chamber E by the second valve mechanism (the extension-side damping force generation valve 34) as expressed by the characteristic line 44 indicated by the solid line in FIGS. 4 and 5.

More specifically, the pressure in the rod-side oil chamber C exceeds the pressure in the bottom-side oil chamber B during the extension stroke of the piston rod 6. When the solenoid 21 is energized by power supply from outside so as to adjust the generated damping force derived from the damping force adjustment valve 16 to the soft characteristic while the vehicle is running on a good-conditioned road, the pilot pressure in the back-pressure chamber 19 reduces according to the opening of the poppet valve body 20 as illustrated in FIG. 3, and therefore the valve-opening setting pressure of the main valve body 18 reduces. Therefore, the hydraulic oil in the rod-side oil chamber C flows into the oil passage 5C of the piston 5 via the oil holes 8B of the valve case 8 according to the opening of the main valve body 18. Then, this inflow oil is introduced from the oil passage 5C of the piston 5 (the upper portion chamber D) into the second oil path 32B of the free piston 32, and flows into the lower-portion chamber E and the bottom-side oil chamber B when the extension-side damping force generation valve 34 is opened. As a result, the extension-side damping force generation valve 34 can generate a damping force according to the piston speed as expressed by the characteristic line 44 indicated by a thick line in FIG. 5 against the hydraulic oil flowing from the upper-portion chamber D to the lower-portion chamber E.

Further, during the compression stroke of the piston rod 6, in the state that the pressure in the bottom-side oil chamber B exceeds the pressure in the rod-side oil chamber C, the hydraulic oil from the lower-portion chamber E flows into the upper-portion chamber D and enters the oil passage 5C of the piston 5 while opening the compression-side damping force generation valve 33 via the first oil path 32A of the free piston 32. Then, this inflow oil flows into the rod-side oil chamber C from the oil holes 8B of the valve case 8 while opening the main valve body 18 of the damping force adjustment valve 16, and a predetermined damping force on the compression side can be generated by the above-described compression-side damping force generation valve 33 and the main valve body 18 as expressed by the characteristic line 48 indicated by a thick line in FIG. 5.

Figure 6:
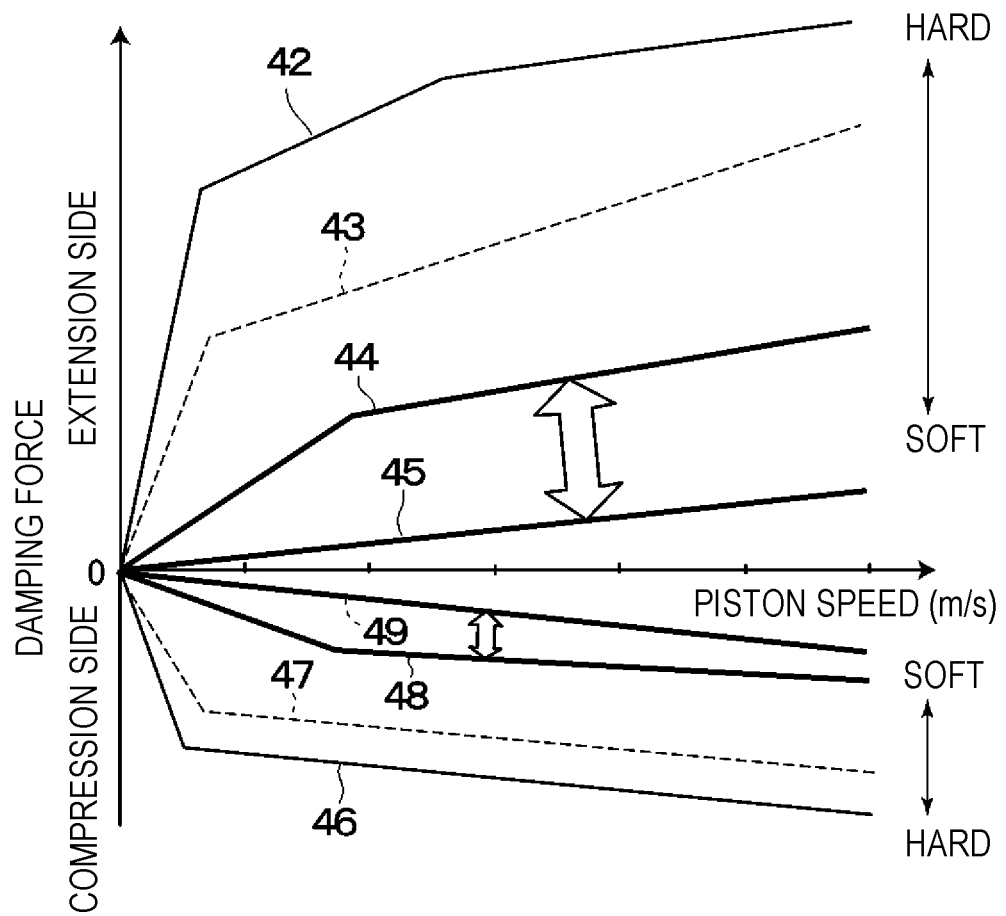
FIG. 6 illustrates the characteristic lines representing the relationship between the piston speed and the generated damping force of the damping force adjustable shock absorber when the vehicle is running on a good-conditioned road (slight undulation and slight protrusions).

Next, when the vehicle is running on a good-conditioned road (slight undulation and slight protrusions), the characteristic of the generated damping force during the extension stroke can be variably controlled according to the piston speed, for example, as expressed by the characteristic lines 44 and 45 indicated by thick lines in FIG. 6. Then, as the characteristic line 44, the frequency adaptive mechanism 31 is set to a higher damping force characteristic than the characteristic line 45 because the vibration of the vehicle is in a low-frequency state lower than the above-described cutoff frequency, in addition to the damping force adjustment valve 16 set to the soft characteristic. However, in a high-frequency state that the vibration of the vehicle increases to a pressure equal to or higher than the above-described cutoff frequency due to, for example, the slight protrusions on the road surface, the characteristic of the generated damping force can be lowered from the characteristic line 44 to the characteristic line 45 by the frequency adaptive mechanism 31.

Further, the characteristic of the generated damping force during the compression stroke can be variably controlled according to the piston speed, for example, as expressed by the characteristic lines 48 and 49 indicated by thick lines in FIG. 6. Then, as the characteristic line 48, the frequency adaptive mechanism 31 is set to a higher damping force characteristic than the characteristic line 49 because the vibration of the vehicle is in a low-frequency state lower than the above-described cutoff frequency, in addition to the damping force adjustment valve 16 set to the soft characteristic. However, in a high-frequency state that the vibration of the vehicle increases to a pressure equal to or higher than the above-described cutoff frequency due to, for example, the slight protrusions on the road surface, the characteristic of the generated damping force can be lowered from the characteristic line 48 to the characteristic line 49 by the frequency adaptive mechanism 31.

Figure 7:
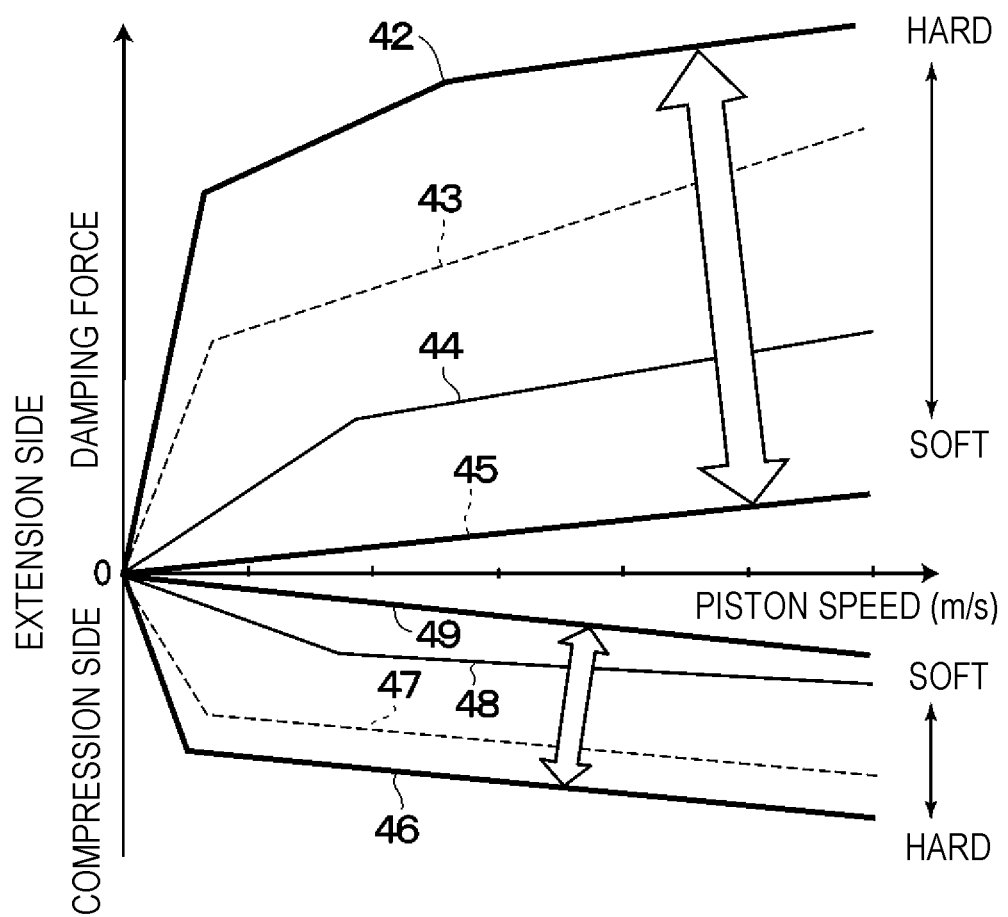
FIG. 7 illustrates the characteristic lines representing the relationship between the piston speed and the generated damping force of the damping force adjustable shock absorber when the vehicle is running on a bad-conditioned road (a relatively large input).

Next, when the vehicle is running on a bad-conditioned road (a relatively large input), the characteristic of the generated damping force during the extension stroke can be variably controlled according to the piston speed in a wide range between the characteristic line 42 and the characteristic line 45 indicated by thick lines in FIG. 7. Further, the characteristic of the generated damping force during the compression stroke can be variably controlled according to the piston speed, for example, within a range of the characteristic lines 46 and 49 indicated by thick lines in FIG. 7.

Figure 8:
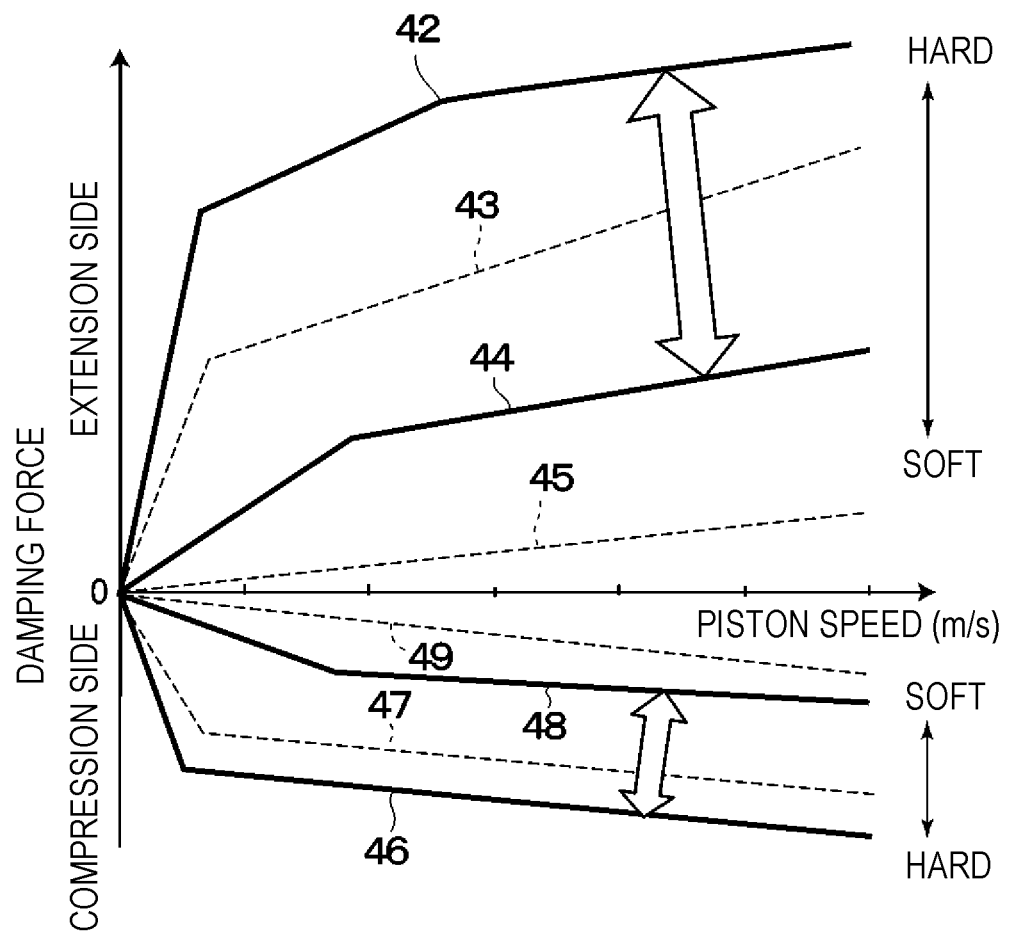
FIG. 8 illustrates the characteristic lines representing the relationship between the piston speed and the generated damping force of the damping force adjustable shock absorber when the vehicle is steered.

Next, when the vehicle is steered, the characteristic of the generated damping force during the extension stroke can be variably controlled according to the piston speed within a range between the characteristic line 42 and the characteristic line 44 indicated by thick lines in FIG. 8. Further, the characteristic of the generated damping force during the compression stroke can be variably controlled according to the piston speed, for example, within a range of the characteristic lines 46 and 48 indicated by thick lines in FIG. 8.

In this manner, according to the present embodiment, the damping force adjustable hydraulic shock absorber 1 includes the flow path (the oil passage 5C of the piston 5) in which the flow of the hydraulic fluid is generated due to the movement of the piston rod 6, and the damping force adjustment valve 16 provided in the above-described flow path and subjected to the adjustment of the opening/closing operation thereof by the solenoid 21. In this hydraulic shock absorber 1, the frequency adaptive mechanism 31, which reduces the damping force for a high-frequency vibration, is provided in the above-described flow path in series with the damping force adjustment valve 16. Then, the frequency adaptive mechanism 31 provided in series with the damping force adjustment valve 16 in the inner cylinder 4 is equipped with the second valve mechanism (for example, the compression-side damping force generation valve 33 and the extension-side damping force generation valve 34) that applies the resistance force to the flow of the hydraulic fluid from the upstream-side chamber (for example, the upper-portion chamber D or the lower-portion chamber E) to the downstream-side chamber (for example, the lower-portion chamber E or the upper-portion chamber D).

This eliminates the necessity of providing a child valve corresponding to the above-described second valve mechanism above the piston 5 (for example, above the damping force adjustment valve), thereby being able to achieve a frequency dependent function while keeping the sacrifice of the axial length of the shock absorber to a minimum. Therefore, the present configuration can allow the damping force adjustable hydraulic shock absorber 1 to have a shorter axial length, thereby allowing it to be formed compactly as a whole, and also can contribute to improving the ride comfort on the vehicle.

Now, the damping force adjustment valve 16 and the frequency adaptive mechanism 31 are disposed in the cylinder (for example, the inner cylinder 4). Further, the hydraulic shock absorber 1 is configured in such a manner that the damping force adjustment valve 16 is provided on the piston rod 6, and the frequency adaptive mechanism 31 is disposed on the bottom valve 11 side (i.e., below the piston 5). This configuration allows the second valve mechanism (for example, the compression-side damping force generation valve 33 and the extension-side damping force generation valve 34) included in the frequency adaptive mechanism 31 to be arranged below the piston 5 (on the bottom valve 11 side) in the inner cylinder 4, thereby achieving the frequency dependent function while keeping the sacrifice of the axial length of the shock absorber to a minimum.

Compared thereto, in a case where the child valve corresponding to the second valve mechanism is provided on, for example, the outer periphery of the rod, the damping force may excessively increase unless the disk is set to a large valve-opening amount, and therefore the design flexibility is impaired. On the other hand, according to the present embodiment, the design flexibility can be enhanced by disposing the frequency adaptive mechanism 31 and the second valve mechanism (the compression-side damping force generation valve 33 and the extension-side damping force generation valve 34) on the bottom side in the cylinder.

Figure 5:
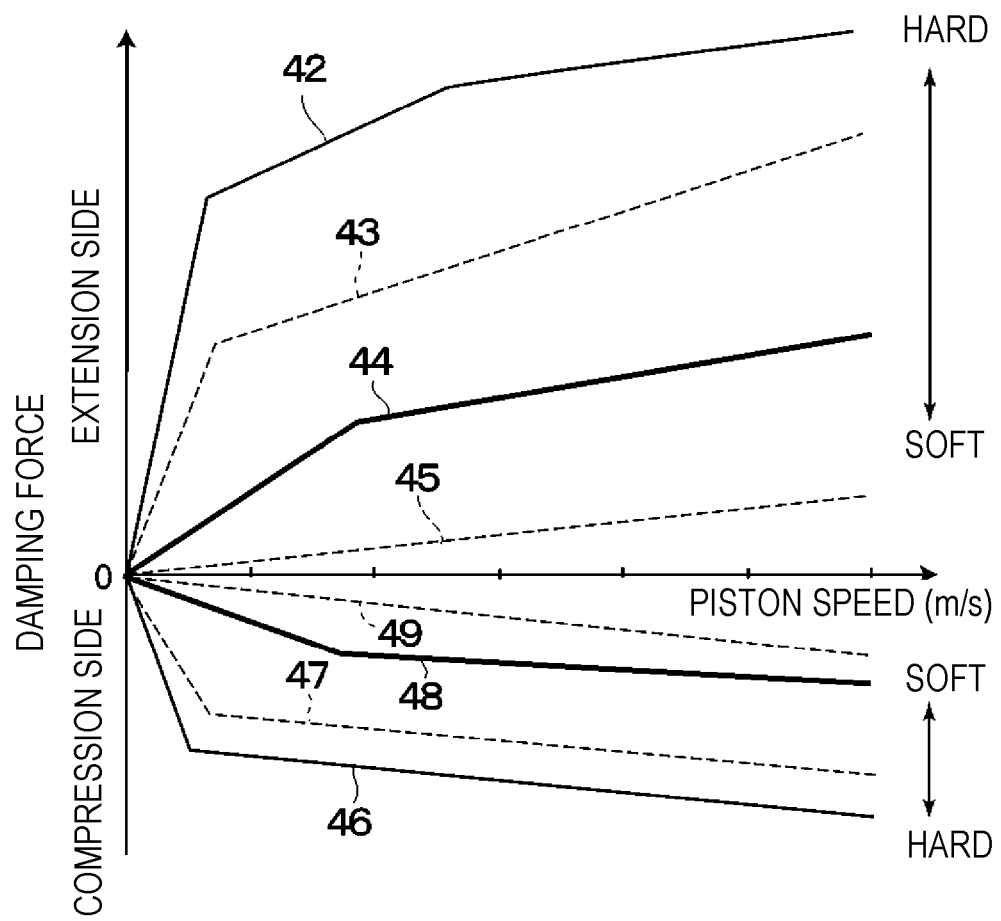
FIG. 5 illustrates the characteristic lines representing the relationship between the piston speed and the generated damping force of the damping force adjustable shock absorber when a vehicle is running on a good-conditioned road (slight undulation).

In addition, according to the present embodiment, in the state that the damping force adjustment valve 16 is switched to the soft characteristic by power supply from outside, the hydraulic shock absorber 1 can adjust the damping force characteristic by the above-described second valve mechanism independent of the control valve (for example, the solenoid 21 and the poppet valve body 20), thereby being able to maintain both the ride comfort on a bad-conditioned road where the semi-active control (i.e., the damping force control by the solenoid 21) intervenes and the vibration damping performance on the sprung side at the time of emergency steering in addition to being able to improve the ride comfort on the vehicle by the above-described second valve mechanism that does not adjust the damping force, for example, as expressed by the characteristic lines 44 and 48 indicated by the thick lines in FIG. 5 on a good-conditioned road where the control on the solenoid 21 (the semi-active control) does not intervene.

In the above-described embodiment, the hydraulic shock absorber 1 has been described citing the example in which the piston 5 is configured in such a manner that the annular step 5A and the cylindrical extension portion 5B are integrally provided on the lower side of the piston 5. However, the present invention is not limited thereto, and, for example, the piston 5 may be configured in such a manner that the portion corresponding to the annular step and/or the cylindrical extension portion is formed as a different member (a different material) from the piston, and they are integrated using a fixation method such as threadable engagement or joining after that. Further, the valve case 8 may also be configured in such a manner that, for example, the portion inside which the plunger 25 is fittedly inserted and the portion inside which the main valve body 18 is provided are formed as different members (different materials), and they are integrated using a fixation method such as threadable engagement or joining after that.

On the other hand, according to the above-described embodiment, the hydraulic shock absorber 1 has been described citing the example in which the main valve body 18 (the annular valve portion 18C) of the damping force adjustment valve 16 is formed by the setting pressure-variable valve body that is vertically slidably displaced on the inner peripheral side of the lower portion of the valve case 8 when being seated on and separated from the annular valve seat 17A of the valve seat member 17. However, the present invention is not limited thereto, and the damping force adjustment valve may be formed by, for example, a setting pressure-variable valve body using a disk valve.

Further, in the above-described embodiment, the hydraulic shock absorber 1 has been described citing the example in which the poppet valve body 20 (the pilot valve member) of the damping force adjustment valve 16 is configured as the normally-closed valve that is normally closed in the deenergized state and is opened when the solenoid 21 is energized. However, the present invention is not limited thereto, and the hydraulic shock absorber 1 may employ, for example, a normally-opened valve in which the poppet valve body (the pilot valve member) is opened with the solenoid in the deenergized state and is closed when the solenoid is energized.

Further, in the above-described embodiment, the hydraulic shock absorber 1 has been described citing the example in which the damping force adjustment device 15, which variably controls the damping force derived from the damping force adjustment valve 16 according to the current value using power supply to the solenoid 21, is provided between the piston 5 and the piston rod 6 in the inner cylinder 4 (the cylinder). However, the present invention is not limited thereto, and the hydraulic shock absorber 1 may be configured in such a manner that the damping force adjustment device including the damping force adjustment valve and the solenoid is provided, for example, so as to be attached to the side on the outer peripheral side of the cylinder (for example, the outer cylinder 2).

Next, possible configurations as the damping force adjustable shock absorber covered by the above-described embodiment include the following examples.

As a first configuration of the damping force adjustable shock absorber, a damping force adjustable shock absorber includes a cylinder sealingly containing hydraulic fluid therein, a piston slidably inserted in this cylinder and dividing an inside of the cylinder into a rod-side chamber and a bottom-side chamber, a piston rod coupled with this piston and extending from an end portion of the cylinder to outside, a flow path in which a flow of the hydraulic fluid is generated due to a movement of the piston rod, and a damping force adjustment valve provided in the flow path and configured to be subjected to an adjustment of an opening/closing operation by a solenoid. A frequency adaptive mechanism is provided in the flow path in series with the damping force adjustment valve. The frequency adaptive mechanism is configured to reduce a damping force for a high-frequency vibration. The frequency adaptive mechanism further includes a second valve mechanism configured to apply a resistance force to a flow of the hydraulic fluid from an upstream-side chamber to a downstream-side chamber.

As a second configuration of the damping force adjustable shock absorber, in the above-described first configuration, the damping force adjustment valve and the frequency adaptive mechanism are disposed in the cylinder. As a third configuration of the damping force adjustable shock absorber, in the above-described first or second configuration, a bottom valve is provided on a bottom side of the cylinder. As a fourth configuration of the damping force adjustable shock absorber, in the above-described third configuration, the damping force adjustment valve is provided on the piston rod. The frequency adaptive mechanism is disposed on the bottom valve side.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-058729 filed on Mar. 26, 2019. The entire disclosure of Japanese Patent Application No. 2019-058729 filed on Mar. 26, 2019 including the specification, the claims, the drawings, and the abstract is incorporated herein by reference in its entirety.

REFERENCE SIGNS LIST 1 hydraulic shock absorber (damping force adjustable shock absorber)
2 outer cylinder
4 inner cylinder (cylinder)
5 piston
5A annular step
5B cylindrical extension portion
5C oil passage (flow path)
6 piston rod
7 solenoid case
8 valve case
9 rod guide
11 bottom valve
15 damping force adjustment device
16 damping force adjustment valve
17 valve seat member
17A annular valve seat
18 main valve body
18C annular valve portion
19 back-pressure chamber
20 poppet valve body
21 solenoid
31 frequency adaptive mechanism
32 free piston
33 compression-side damping force generation valve (second valve mechanism)

34 extension-side damping force generation valve (second valve mechanism)
A reservoir chamber
B bottom-side oil chamber (bottom-side chamber)
C rod-side oil chamber (rod-side chamber)

The invention claimed is:

1. A damping force adjustable shock absorber comprising:
a cylinder sealingly containing hydraulic fluid therein;
a piston slidably inserted in this cylinder and dividing an inside of the cylinder into a rod-side chamber and a bottom-side chamber;
a piston rod coupled with this piston and extending from an end portion of the cylinder to outside;
a flow path in which a flow of the hydraulic fluid is generated due to a movement of the piston rod; and
a damping force adjustment valve mechanism provided in the flow path and configured to be subjected to an adjustment of an opening/closing operation by a solenoid,
wherein a frequency adaptive mechanism is provided in the flow path in series with the damping force adjustment valve, the frequency adaptive mechanism being configured to reduce a damping force for a high-frequency vibration,
wherein the frequency adaptive mechanism further includes a second valve mechanism configured to apply a resistance force to a flow of the hydraulic fluid from an upstream-side chamber to a downstream-side chamber, and upper and lower retainers disposed above and below the second valve mechanism,
wherein the frequency adaptive mechanism is supported by elastic members contacting the upper and lower retainers, respectively,
wherein the damping force adjustment valve mechanism includes:
a valve case;
a main valve body which is fittedly inserted in a slidable manner in the valve case;
a valve seat member,
a back-pressure chamber configured to press the main valve body toward the lower-side valve seat member with a pilot pressure; and
a valve body configured to adjust the pilot pressure in the back-pressure chamber, the main valve body being set to a valve-opening pressure adjusted according to the opening degree of the valve body,
wherein the frequency adaptive mechanism is provided on the lower side of the piston via a cylindrical extension portion extending from the lower side of the piston.

2. The damping force adjustable shock absorber according to claim 1, wherein the damping force adjustment valve and the frequency adaptive mechanism are disposed in the cylinder.

3. The damping force adjustable shock absorber according to claim 1, wherein a bottom valve is provided on a bottom side of the cylinder.

4. The damping force adjustable shock absorber according to claim 3, wherein the damping force adjustment valve is provided on the piston rod, and
wherein the frequency adaptive mechanism is disposed on the bottom valve side.

5. The damping force adjustable shock absorber according to claim 2, wherein a bottom valve is provided on a bottom side of the cylinder.

6. The damping force adjustable shock absorber according to claim 5, wherein the damping force adjustment valve is provided on the piston rod, and
wherein the frequency adaptive mechanism is disposed on the bottom valve side.

* * * * *